(No Model.) 2 Sheets—Sheet 1.
F. SHARPE & H. E. BLAKE.
CAMERA OBSCURA.
No. 351,532. Patented Oct. 26, 1886.
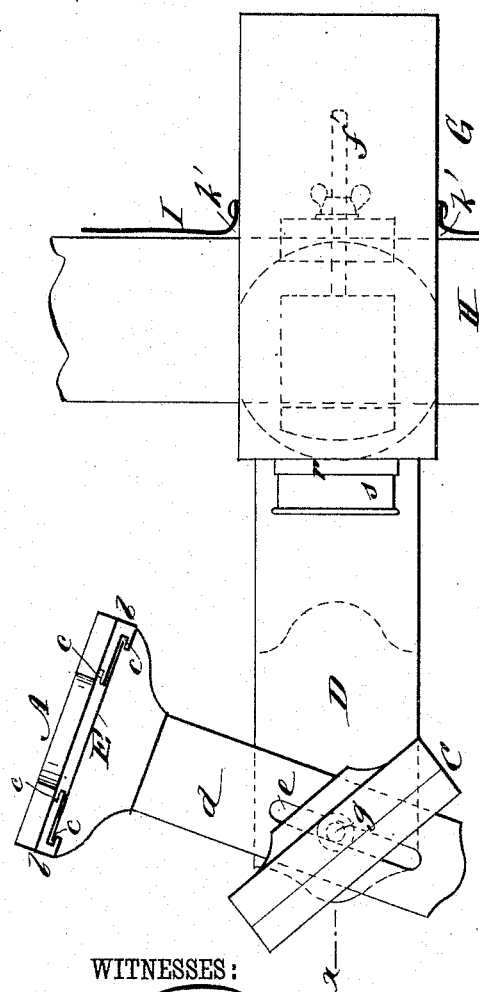
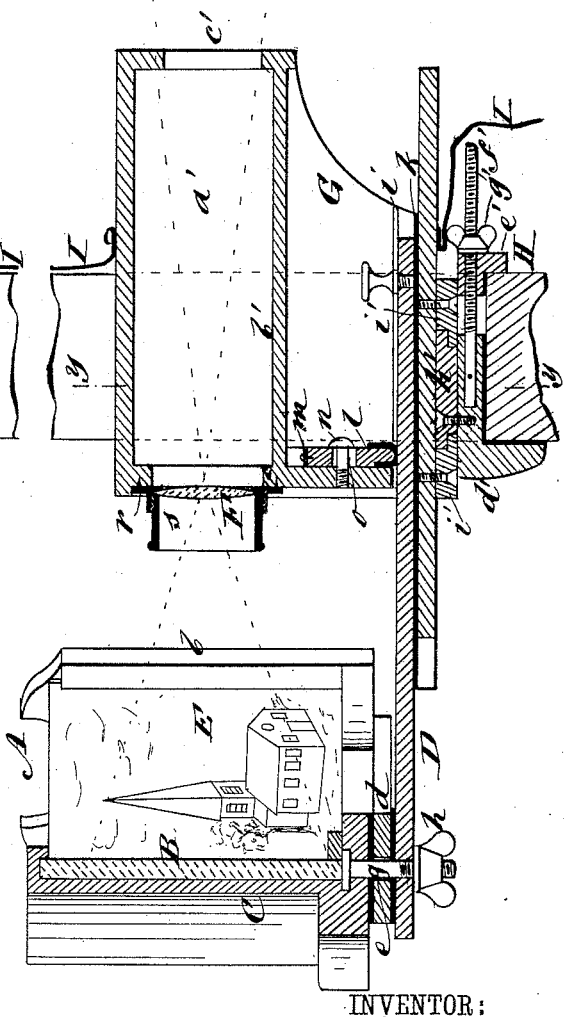
WITNESSES:
C. Neveux
C. Sedgwick
INVENTOR:
F. Sharpe
H. E. Blake
BY Munn & Co.
ATTORNEYS.

(No Model.) 2 Sheets—Sheet 2.
F. SHARPE & H. E. BLAKE.
CAMERA OBSCURA.
No. 351,532. Patented Oct. 26, 1886.
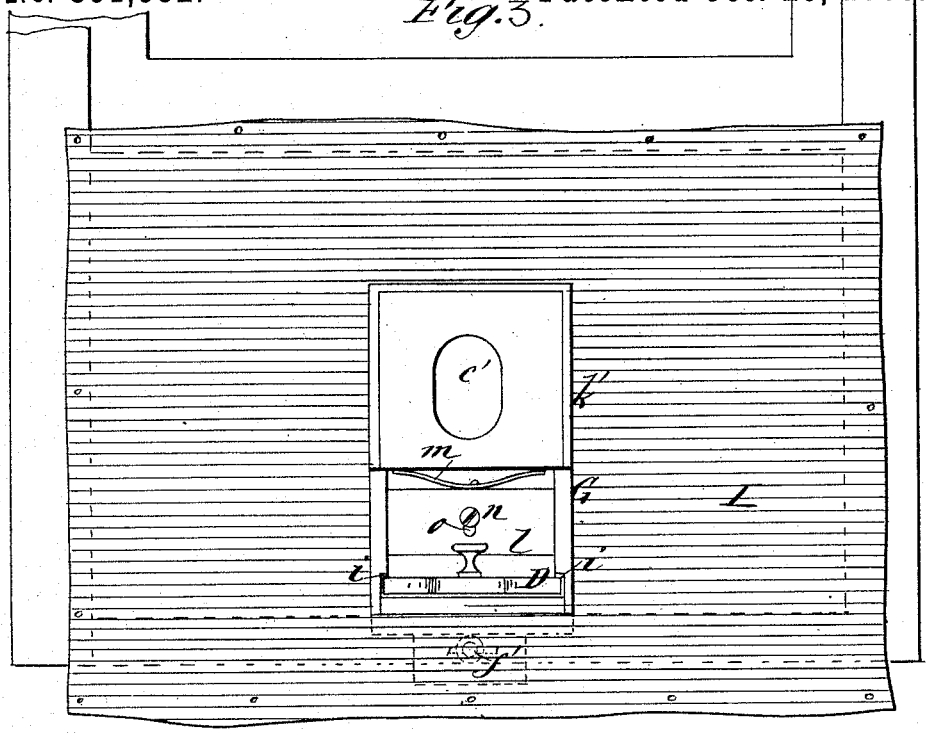
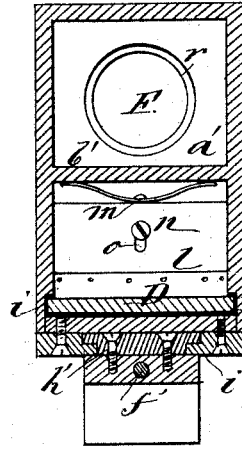
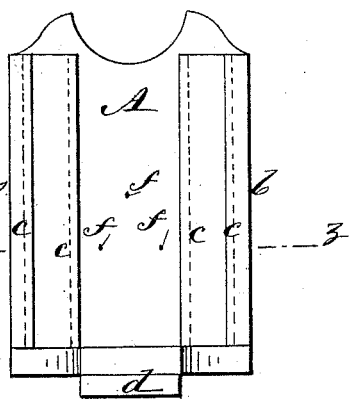
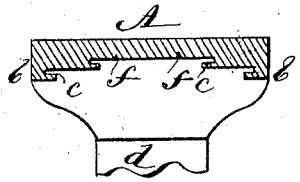
WITNESSES:
C. Neveux
C. Sedgwick
INVENTOR:
F. Sharpe
H. E. Blake
BY Munro & Co.
ATTORNEYS.

UNITED STATES PATENT OFFICE.

FRANK SHARPE AND HARRY E. BLAKE, OF NORTH ADAMS, MASS.

CAMERA OBSCURA.

SPECIFICATION forming part of Letters Patent No. 351,532, dated October 26, 1886.

Application filed October 14, 1885. Serial No. 179,858. (No model.)

*To all whom it may concern:*

Be it known that we, FRANK SHARPE and HARRY E. BLAKE, of North Adams, in the county of Berkshire and State of Massachusetts, have invented a new and useful Improvement in Camera Obscuras, of which the following is a full, clear, and exact description.

This invention relates to camera obscuras in which the rays from the object are first thrown upon a mirror, and then reflected from the mirror through a convex lens onto a surface placed opposite the lens in a darkened room or chamber, the lens magnifying the image as reflected on the surface or screen in the darkened chamber, so that the enlarged image or its outlines may be traced on said screen or surface.

The invention is more especially designed for the use of artists in taking from photographs and other small pictures correct outlines enlarged to any desired extent, although it may be used for taking enlarged outlines of flowers, leaves, fruit, and other objects. It will suffice here, however, to describe it as adapted to take enlarged outlines from photographs or other small pictures. Among the essential parts of the apparatus are a support for the picture to be enlarged, a mirror, a focusing-slide, a lens, a dark-chamber, an adjustable swiveling clamp, and a curtain, and the invention comprises certain details and various novel constructions and combinations of parts, substantially as hereinafter described, and pointed out in the claims, and whereby the efficiency of the apparatus is improved.

Reference is to be had to the accompanying drawings, forming part of this specification, in which similar letters of reference indicate corresponding parts in all the figures.

Figure 1 represents a plan view of an artist's or reflecting camera obscura embodying our invention, showing the same as applied to a window-frame, and a screen for receiving the reflected and enlarged outlines of the picture or object to be taken. Fig. 2 is a vertical section of the same upon the lines $x\ x$ in Fig. 1; Fig. 3, a rear view of the camera, showing the curtain as applied to the window. Fig. 4 is a section upon the line $y\ y$ in Fig. 2; Fig. 5, a front view of the picture support or holder, and Fig. 6 a sectional view of the same upon the line $z\ z$ in Fig. 5. Fig. 7 is a perspective view of a portion of the curtain.

A is the picture support or holder, which is formed of a standard having facially-projecting sides $b\ b$, containing one, two, or more differently-spaced opposite grooves, $c\ c$, for holding different-sized pictures, said standard being carried by an arm, $d$, having a slot, $e$, near its one end to provide for adjustment of the picture to different distances from the mirror B, the distance being made variable as circumstances require. Ordinarily the picture-holding portion of the support will be adjusted at its greatest distance from the mirror; but in cases of unusually short focuses being needed, the adjustment of the picture-support provides for drawing the picture nearer to the mirror.

Upon the face of the standard of the picture-support A are three small black or other colored dots or marks, $f$, arranged in the form of an equilateral triangle, for use in adjusting the screen S, upon which the image or reflection is to be thrown. Both the mirror and picture are fully exposed to the light.

The support C, which holds the mirror B, has a bolt, $g$, arranged to pass through its base, through the slot $e$ in the arm $d$ of the picture carrier or support, and through the outer end portion of the focusing-slide D of the camera, so that by means of a thumb-nut, $h$, both supports A and C may be secured to or near the outer end of the focusing-slide D. This forms a swiveling clamp, which allows both supports A and C to revolve or swivel around the bolt— that is, first, the picture carrier or support A, so as to cause the rays of the sun to fall as squarely as possible on the picture E, and, secondly, the mirror support or carrier C, so as to reflect the picture squarely through the lens F of the camera. Both the mirror and the picture-support occupy upright positions, and are set at an inclination to each other and the lens.

The slide D, to the end of which the picture and mirror supports A C are attached, is fitted to move forward or backward, according to the focus desired, within or along grooves $i\ i$ in the bottom of the camera-box G. These grooves are lined with any suitable textile fabric, $k$, for the double purpose of excluding light and of giving the necessary friction to the slide, and said fabric lining is for the same purposes attached to or made to extend over the bottom of the box G, between it and the slide.

To prevent the light from passing in along or over the top of the slide D, a self-adjusting packing, $l$, is applied to the forward end of the box G. This packing is represented as made of a flat piece of wood or other rigid material, having its lower margin slightly rounded, and covered with any number of thicknesses of textile or soft fabric, which, by means of a spring, $m$, on top of the packing $l$, is brought into contact with the top of the slide. Said packing is kept in place by a screw, $n$, passing through a slot, $o$, in the packing and entering the front end of the box. This packing is self-adjusting by means of the spring $m$, the screw $n$ being loosely adjusted to admit of the spring always keeping the edge of the packing in contact with the upper surface of the focusing-slide.

The lens F, which is a double convex one, is placed in the end of the dark-chamber of the box facing the mirror. It is mounted in a collar, $r$, made with an inwardly-projecting flange, against which it rests, it being held in place by the end of the lens-tube $s$, screwing into the collar and against the lens. The collar $r$ may be attached to the end of the camera-box by screws passing through its outwardly-projecting flange. The dark-chamber $a'$ is formed by a horizontal partition, $b'$, extending the entire length of the box about midway between its top and bottom. In the opposite end of it to that occupied by the lens is an oblong or other shaped aperture, $c'$, which allows the image to be reflected through it, and such apertured back end of the dark-chamber also serves as a diaphragm to prevent the passage of superfluous rays of light. The walls of the dark-chamber are or may be blackened, so as to absorb unnecessary rays of light.

A clamp is attached to the bottom of the camera-box for fastening the camera to the sill, lower cross-piece, or stool of the window-frame, H. This clamp is made adjustable, so as to fit different widths of sill, and is constructed to allow of the camera being revolved horizontally when clamped to the window-sill, for the purpose of accommodating the camera to the position of the sun. Said clamp consists of a fixed jaw, $d'$, and a movable jaw, $e'$, with a screw-threaded rod, $f'$, of suitable length, fastened to the fixed jaw $d'$ and passing through an aperture in the movable jaw $e'$, which latter, by means of a thumb-nut, $g'$, on the rod is pressed against the one side of the window sill or stool, while the fixed jaw rests against the opposite side of the sill or stool. As represented in the drawings, the movable jaw is shown as bearing against the inside of the sill and the fixed jaw against the outside thereof to provide for working the clamp from the inside of the room; but, if desired, the positions of the two jaws may be reversed—that is, the fixed jaw be on the inside and the movable jaw on the outside, which will do away with the rod $f'$ at all interfering with the curtain I, that serves to exclude the light from passing through the window outside of the camera.

To the upper side of the fixed jaw $d'$, and parallel with its upper surface, is rigidly attached a disk, $h'$, having a lip around the upper portion of its periphery, and to the bottom of the camera-box, and parallel with it, is rigidly attached a flat piece, $i'$, having a circular hole, in which the disk is held by a lip around the lower portion of said aperture, thus allowing the camera to turn or revolve horizontally, the lipped disk and the lipped flat piece which engages with it forming a turntable for the purpose.

The curtain I consists of an opaque fabric of suitable size, having a rectangular flanged or lipped opening, $k'$, near its center, corresponding in size and shape to a vertical cross-section of the camera-box, as clearly shown in Fig. 7. The flange or lip around the opening in the curtain effectually prevents the light from entering the room between the camera-box and curtain. It is adjusted, when used to perform its function of excluding the light, by drawing it over the camera-box, which projects through the rectangular opening in the curtain, the edges of said curtain being fastened to the window-casings, as shown in Fig. 3.

To use the camera, it is clamped to the window-sill or stool, with the end of the camera-box which carries the lens F placed outside, and the apparatus and its picture-support A so adjusted that the rays of the sun will fall as squarely as possible upon the picture when in its support, and the mirror B is so adjusted by its support C as to reflect the image squarely through the lens. The room is darkened so as to exclude all light, excepting what passes through the lens, and the screen, paper, or other surface, S, upon which the reflected image is to be thrown, is placed parallel with the rear end of the camera-box and at the proper distance from it necessary to obtain a reflected image of the desired size. The paper or screen will be found parallel with the end of the camera-box when the three dots or marks $f$ on the face of the picture-support appear to be at equal distances apart when reflected on the paper or screen S. The picture is now placed in its carrier or support A, and by means of the focusing-slide D its reflected image is thrown up sharp and distinct upon the screen or surface S, which allows of all desired outlines being traced thereon.

Having thus described our invention, we claim as new and desire to secure by Letters Patent—

1. The combination, with the focusing-slide of the camera, of the exposed mirror and exposed picture-support, both carried by said slide and adjustable in common with it relatively to the lens of the camera, substantially as specified.

2. The combination, with the focusing-slide of the camera, of the exposed mirror and exposed picture-support, both carried by said slide and adjustable in angular relation with each other in front of the lens of the camera, substantially as specified.

3. The picture-support provided with a slotted arm, in combination with the focusing-slide and the mirror-support fitted to turn on said slide by a pivot or bolt arranged to pass therethrough and through the slot in the arm of the picture-support, and provided with a clamping nut or device, whereby both the picture support and mirror are separately adjustable about a common center and are simultaneously clamped and released, and the distance of the picture-support from the mirror may be varied as required, essentially as specified.

4. The combination, with a camera, of the adjustable picture-support E, provided with a series of opposite side grooves, *c c*, arranged the one pair in advance of the other and at different widths apart, substantially as and for the purpose specified.

5. The picture-support E, having dots or marks *f* on its face, arranged substantially as described, and for the purpose herein set forth.

6. The flexible packing *k*, in combination with the bottom of the camera-box and the focusing-slide D, essentially as described.

7. The slotted packing *l*, having a padded or flexible lower facing, in combination with the spring *m*, the screw *n*, the camera-box G, and the focusing-slide D, substantially as specified.

8. The camera-box provided with a fixed clamping-jaw, *d'*, an adjustable clamping-jaw, *e'*, and a turn-table attachment applied to the fixed jaw and bottom of the box, and adapted to hold the box on said jaw and to provide for the swiveling of the box, essentially as described.

FRANK SHARPE.
HARRY E. BLAKE.

Witnesses:
ARNOLD G. POTTER,
FRANK A. JOHNSON.